United States Patent
Hong et al.

(10) Patent No.: US 11,645,276 B2
(45) Date of Patent: May 9, 2023

(54) PARALLEL DYNAMIC AGGREGATION SYSTEM AND METHOD

(71) Applicant: BANK OF AMERICA CORPORATION, Charlotte, NC (US)

(72) Inventors: Yifei Hong, Livingston, NJ (US); Xiaoyun DePrano, Thousand Oaks, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 95 days.

(21) Appl. No.: 17/039,469

(22) Filed: Sep. 30, 2020

(65) Prior Publication Data
US 2022/0100757 A1 Mar. 31, 2022

(51) Int. Cl.
| | | |
|---|---|---|
| G06F 16/24 | (2019.01) | |
| G06F 16/21 | (2019.01) | |
| G06F 16/2453 | (2019.01) | |
| G06F 16/2455 | (2019.01) | |
| G06F 16/242 | (2019.01) | |

(Continued)

(52) U.S. Cl.
CPC ...... *G06F 16/24532* (2019.01); *G06F 16/213* (2019.01); *G06F 16/2282* (2019.01); *G06F 16/244* (2019.01); *G06F 16/2465* (2019.01); *G06F 16/24552* (2019.01)

(58) Field of Classification Search
CPC ........... G06F 16/24532; G06F 16/2282; G06F 16/24552; G06F 16/2465; G06F 16/244; G06F 16/213
See application file for complete search history.

(56) References Cited

U.S. PATENT DOCUMENTS 6,161,103 A * 12/2000 Rauer .................. G06Q 30/02
6,189,004 B1 * 2/2001 Rassen ................ G06F 16/2423
707/999.102

(Continued)

FOREIGN PATENT DOCUMENTS

| EP | 1208475 A1 * | 5/2002 |
| EP | 1208475 A1 | 5/2002 |

OTHER PUBLICATIONS

Filali et al., "A Hybrid Collaborative Clustering Using Self-Organizing map", IEEE 2017.*

(Continued)

*Primary Examiner* — Daniel A Kuddus
(74) *Attorney, Agent, or Firm* — Moore & Van Allen PLLC; James C. Edwards (57) ABSTRACT

Aggregation of data and subsequent diving and/or grouping (i.e., slicing and dicing) of the aggregated data occurs by multi-stage parallel processing. Initially, multiple aggregation jobs are executed in parallel to aggregate data from a granular level to a higher level. Subsequently, query sets are executed in parallel for each of the aggregation jobs to divide and/or group the higher level data according to the queries and the segregated results are stored in a single table, which is partitioned for each aggregation job. Parallel processing of the query sets and storage in a single table is made possible by implementing a hybrid dynamic database schema, in which each table in the database includes one or more additional fields, each additional field comprising a set of dimension-dimension value pairs.

11 Claims, 7 Drawing Sheets

(51) Int. Cl.
*G06F 16/22* (2019.01)
*G06F 16/2458* (2019.01)

(56) References Cited

U.S. PATENT DOCUMENTS

| | | | | |
|---|---|---|---|---|
| 6,212,524 | B1* | 4/2001 | Weissman | G06F 16/283 |
| | | | | 707/769 |
| 6,374,263 | B1* | 4/2002 | Bunger | G06F 16/24539 |
| | | | | 709/203 |
| 7,461,076 | B1* | 12/2008 | Weissman | G06F 16/284 |
| | | | | 707/999.102 |
| 8,886,631 | B2* | 11/2014 | Abadi | G06F 16/24532 |
| | | | | 707/713 |
| 8,918,388 | B1* | 12/2014 | Chen | G06F 16/283 |
| | | | | 707/715 |
| 10,795,884 | B2* | 10/2020 | Bhattacharjee | G06F 16/2465 |
| 10,853,082 | B1* | 12/2020 | Aleti | G06F 9/3855 |
| 10,977,260 | B2* | 4/2021 | Pal | H04L 67/535 |
| 2012/0310916 | A1* | 12/2012 | Abadi | G06F 16/24542 |
| | | | | 707/E17.017 |
| 2013/0110766 | A1 | 5/2013 | Promhouse et al. | |
| 2013/0166534 | A1 | 6/2013 | Yoon et al. | |
| 2014/0156636 | A1* | 6/2014 | Bellamkonda | G06F 16/24556 |
| | | | | 707/718 |
| 2014/0372439 | A1* | 12/2014 | Lu | G06F 16/35 |
| | | | | 707/737 |
| 2017/0031980 | A1* | 2/2017 | Kamfonas | G06F 16/24556 |
| 2018/0089262 | A1* | 3/2018 | Bhattacharjee | G06F 16/24535 |
| 2018/0089306 | A1* | 3/2018 | Pal | G06F 16/24535 |
| 2018/0089312 | A1* | 3/2018 | Pal | G06F 16/26 |
| 2019/0138642 | A1* | 5/2019 | Pal | G06F 16/27 |
| 2019/0258631 | A1* | 8/2019 | Pal | G06F 16/24535 |

OTHER PUBLICATIONS

Beckman et al., Extending RDBMSs to Support Sparse Datasets Using an interpreted attribute storage format; IEEE 2006.*
Beckmann et al., Extending RDBMSs to Support Sparse Datasets Using an Interpreted Attribute Storage Format. (Year:2006).
Agrawal et al., Storage and Querying of E-Commerce Data. (Year:2001).

* cited by examiner

| MODEL OUTPUT | TOTAL EXECUTION TIME IN PARALLEL MODE | AVERAGE EXECUTION TIME PARALLEL PER AGGREGATION | AVERAGE EXECUTION TIME SERIAL PER AGGREGATION | PERFORMANCE BOOST RATIO |
|---|---|---|---|---|
| 1ST SET OF AGGREGATION JOBS | 2 hours, 39 minutes | 6.2 seconds | 185.1 seconds | 30 |
| 2nd SET OF AGGREGATION JOBS | 58 minutes | 2.2 seconds | 108.9 seconds | 50 |
| 3rd SET OF AGGREGATION JOBS | 54 minutes | 33.1 seconds | 142.8 seconds | 4 |
| 4th SET OF AGGREGATION JOBS | 6 minutes | 4.0 seconds | 70.0 seconds | 18 |

PARALLEL DYNAMIC AGGREGATION SYSTEM AND METHOD

FIELD OF THE INVENTION

The present invention relates to data processing and, more specifically, multi-stage parallel aggregation of data, in which multiple aggregation jobs are processed in parallel to aggregate data from a granular level to a higher level and, subsequently, query sets are executed, in parallel, on each aggregation job with the results being stored in a single database table.

BACKGROUND

In today's computing environment, businesses and the like accumulate large volumes of data (i.e., so called "big data"). Once accumulated, this data is subsequently "mined", which requires that the data be aggregated from a lowest granular level to a higher level for purposes of analysis.

Specific challenges exist when aggregating such massive volumes of data. First, the data must be aggregated efficiently. In many instances, aggregation results are relied upon by downstream applications and systems. As a result, the faster the aggregation process, the faster the downstream applications and systems are able to perform their respective operations and functions. Many of these downstream applications and systems may be time dependent and, as a result, require the aggregation process to be performed as quickly as possible.

Secondly, the data structure (i.e., data table and database schema) implemented in the aggregation process must be robust and stable to support the ever-increasing analytical needs of the users. In this regard, the data table/database must be stable in order to support downstream applications and processes which use the data in the database for various needs. Specifically, if a change occurs to the data structure of the aggregation database (e.g., add new fields, remove fields or the like), changes to the downstream applications and processes must be minimized so as to lessen the likelihood of interruption to the downstream applications and processes.

Many commercial business intelligence tools are available for data mining and/or aggregation; however, these existing tools are not without limitations. Typically, the existing business intelligence tools provide a trade off between either processing efficiency or robust/stable data structure. For example, a business intelligence tool that provides for efficiency in processing may be limited in terms of the data structure stability, since must business intelligence have a rigid database design/table structure. In other instances, business intelligence tools that provide data structure robustness/stability may be limited in terms of processing efficiency, i.e., not able to aggregate data fast enough or not able to aggregate data to the desired granularity level.

Therefore, a need exists to generate aggregation mechanisms that produce results in efficiently and provide for a stable/robust data structure. In this regard, the desired systems, processes and the like should provide for aggregating data from lowest granular level to any one of a higher level in an efficient manner that meets the time requirements imposed by the analytical demands of the users. Moreover, the desired systems, processes and the like should provide for such efficiency while also provide for a stable and robust data structure. In this regard, the data tables and database implemented in the aggregation process should be flexible and robust such that changes to the tables or database have minimal downstream effect.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for multi-stage parallel aggregation processing. Initially, a plurality of aggregation jobs are processed, in parallel, on multiple threads to aggregate a data set from a lowest granular level to a desired higher level. Subsequently, multiple queries are executed, in parallel, on each aggregation job to divide and/or group the results and the resulting divided and/or grouped aggregation job results are stored within a single table of database. By performing both the aggregation jobs and the dividing and/or grouping (i.e., slicing and dicing) of the data for the aggregated jobs in parallel, the present invention provides for an increase in overall processing efficiency upwards of 20× to 50×. Moreover, by storing the results of the aggregation and segregation processes in one table having one database schema, the invention provides robustness and stability to downstream applications and processes, which conventionally are required to interface with multiple tables having different schemas to acquire requisite aggregation results.

In specific embodiments of the invention, parallel processing of query sets for aggregation jobs and the subsequent storage of divided and/or grouped aggregation results within a single table is made possible by implementing a hybrid dynamic database schema. The schema is a hybrid of both horizontal and vertical database schema, in that, while a vertical schema has only one dimension—dimension value pair per record, the hybrid schema of the present invention provides for multiple dimension-dimension value pairs per record. In this regard, the schema provides for additionally fields, so called DimSets, with each additional field comprising one and typically multiple dimension-dimension value pairs. In this regard, while a vertical database schema can only perform the dividing and grouping phase of aggregation/using one isolated dimension-dimension pair, the hybrid schema of the present invention is capable of performing multiple dividing and/or grouping processes simultaneously (i.e., in parallel) using the multiple dimension fields. The dynamic nature of the database schema is realized by the ability of the schema to support various different additional fields (i.e., additional DimSets) with different combinations of dimension-dimension value pairs (i.e., a different list of dimensions). Each additional field serves as criteria by which the aggregated data can be divided and/or grouped and whenever new criteria is required, a new additional field/DimSet can be added to the table while the overall table schema remains intact.

A system for multi-stage parallel aggregation of big data defines first embodiments of the invention. The system includes a computing platform including a memory, and one or more processing devices stored in the memory. The system further includes a data aggregation engine that is stored in the memory and executable by at least one of the processing devices. The data aggregation engine is configured to execute, in parallel on multiple threads, a plurality of aggregation jobs, each aggregation job configured to aggregate data from a lowest granularity level to a higher granularity level. Additionally, the system includes a data query engine that is stored in the memory and executable by at least one of the processing devices. The data query engine is configured to receive a query set for each of the aggregation jobs, each query in the query sets defining one or more dimension fields in a database schema, and execute, in parallel, the queries within the query sets to divide and/or group the results of a corresponding aggregation job. In addition, the system includes a database including one or more tables, such that, a single table in the database is configured to store the divided and/or grouped results of each of the plurality of aggregation jobs.

In specific embodiments the system additionally includes a modeling tool that is stored in the memory and executable by at least one of the processing devices. The modeling tool is configured receive a plurality of input variable sets, each input variable set corresponding to an aggregation job, execute one or more modeling algorithms based on the input variable sets, and output, for each input variable set, results of the modeling algorithms, wherein the results define the data at the granular level that is aggregated by the data aggregation engine.

In other specific embodiments of the system, the single table is divided into a plurality of partitions, each partition in the table is configured to store the divided and/or grouped result of one of the plurality of aggregation jobs.

In still further specific embodiments of the system, the database is configured with a hybrid vertical/horizontal database schema in which the tables are configured to provide for more than one dimension-dimension value pairs. In related specific embodiments of the system, the hybrid vertical/horizontal database schema is configured for each table in the database to include one or more additional fields (e.g., DimSet field), each additional field comprising a set of dimension-dimension value pairs (i.e., a grouping of different dimension fields). According to such embodiments Each additional field (i.e., set of dimension-dimension value pairs) serves as criteria by which the dividing and/or grouping phase of data aggregation can occur. In further related embodiments of the system, each of the one or more additional fields comprises up to n number of dimension-dimension value pairs, wherein n is a maximum number of possible dimensions required in each of the one or more tables in the database.

In further specific embodiments of the system, the data aggregation engine is further configured to store data to be aggregated in cache memory, and share at least a portion of the data from the cache memory amongst the multiple threads, wherein the at least a portion of the data is data that is common amongst the multiple threads.

A computer-implemented method for multi-stage parallel aggregation of big data defines second embodiments of the invention. The method is executed by one or more computing processor devices. The method includes executing, in parallel on multiple threads, a plurality of aggregation jobs, each aggregation job configured to aggregate data from a lowest granular level to a higher granular level. In addition, the method includes receiving a query set for each of the aggregation jobs, each query in the query sets defining one or more dimension fields in a database schema and executing, in parallel, the queries within the query sets to divide and/or group results of a corresponding aggregation job. In addition, the method includes storing the divided and/or grouped results of each of the aggregation jobs within a single table of a database.

In specific embodiments the computer-implemented method further includes receiving a plurality of input variable sets, executing one or more modeling algorithms based on the input variable sets, and outputting, for each input variable set, results of the modeling algorithms, such that, the results define the data at the granular level for executing the plurality of aggregation jobs.

In further specific embodiments of the computer-implemented method, storing further includes storing the divided and/or grouped results of each of the aggregation jobs within the single table divided into a plurality of partitions, wherein each partition stores the divided and/or grouped results of one of the plurality of aggregation jobs.

In further specific embodiments of the computer-implemented method, storing further includes storing the divided and/or grouped results of each of the aggregation jobs within the single table of the database configured with a hybrid vertical/horizontal database schema defined by each table/record in the database being configured for a plurality of dimension-dimension value pairs. In related embodiments of the computer-implemented method, storing further comprises storing the divided and/or grouped results of each of the aggregation jobs within the single table of the database configured with the hybrid vertical/horizontal database schema, wherein each table in the database includes one or more additional fields (e.g., DimSet fields), each additional field comprising a set of dimension-dimension value pairs (i.e., a grouping of different dimension fields).

In still further specific embodiments the computer-implemented method includes storing data to be aggregated in cache memory, and sharing at least a portion of the data from the cache memory amongst the multiple threads, wherein the at least a portion of the data is data that is common amongst the multiple threads.

A computer program product including a non-transitory computer-readable medium defines third embodiments of the invention. The computer-readable medium includes a first set of codes for causing a computer to execute, in parallel on multiple threads, a plurality of aggregation jobs, each aggregation job configured to aggregate data from a granular level to a higher level. In addition, the computer-readable medium includes a second set of codes for causing a computer to receive a query set for each of the aggregation jobs, each query in the query sets defining one or more dimension fields in a database schema. Additionally, the computer-readable medium includes a third set of codes for causing a computer to execute, in parallel, the queries within the query sets to divide and/or group results of a corresponding aggregation job. Moreover, the computer-readable medium includes a fourth set of codes for causing a computer to store the divided and/or grouped results of each of the aggregation jobs within a single table of a database.

In specific embodiments of the computer program product, the computer readable-medium additionally includes a fifth set of codes for causing a computer to receive a plurality of input variable sets, execute one or more modeling algorithms based on the input variable sets; and output, for each input variable set, results of the modeling algorithms, wherein the results define the data at the granular level for executing the plurality of aggregation jobs.

In other specific embodiments of the computer program product, the fourth set of codes is further configured to cause the computer to store the divided and/or grouped results of each of the aggregation jobs within the single table divided into a plurality of partitions, such that, each partition stores the divided and/or grouped results of one of the plurality of aggregation jobs.

In still further specific embodiments of the computer program product, the fourth set of codes is further configured to cause the computer to store the divided and/or grouped results of each of the aggregation jobs within the single table of the database configured with a hybrid vertical/horizontal database schema defined by each table in the database being configured for a plurality of dimension-dimension value pairs. In related embodiments of the computer program product, the fourth set of codes is further configured to cause the computer to store the divided and/or grouped results of each of the aggregation jobs within the single table of the database configured with the hybrid vertical/horizontal database schema, wherein each table in the database includes one or more additional fields (e.g., DimSet fields), each additional field comprising a set of dimension-dimension value pairs (i.e., a grouping of different dimension fields).

In still further specific embodiments of the computer program product, the computer-readable medium includes a fifth set of codes for storing data to be aggregated in cache memory, and sharing at least a portion of the data from the cache memory amongst the multiple threads, wherein the at least a portion of the data is data that is common amongst the multiple threads.

Thus, systems, apparatus, methods, and computer program products herein described in detail below provide for multi-stage parallel aggregation processing. Initially, a plurality of aggregation jobs are processed, in parallel, (i.e., each aggregation job being executed on separate threads) to aggregate a data set from a lowest granular level to a desired higher level. In response to aggregating the data to a desired granularity level, multiple queries (i.e., a query set) are executed, in parallel, on each aggregation job to divide and/or group the results and the resulting divided and/or grouped aggregation job results are stored within a single table of database. By performing both the aggregation jobs and the dividing and/or grouping (i.e., slicing and dicing) of the data for the aggregated jobs in parallel, the present invention provides for an increase in overall processing efficiency. Additionally, by storing the results of the initial aggregation and diving and grouping processes in one table having one database schema, the invention provides robustness and stability to downstream applications and processes, which conventionally are required to interface with multiple tables having different schemas to acquire requisite aggregation results. The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as PYTHON, JAVA, PERL, SMALLTALK, C++, SPARK SQL, HADOOP HIVE or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" or "configured for" perform (or "configured for" performing) a certain function in a variety of ways, including, for example, by having one or more general-purpose circuits perform the function by executing particular computer-executable program code embodied in computer-readable medium, and/or by having one or more application-specific circuits perform the function.

Thus, as described in more detail below, embodiments of the present invention provide for multi-stage parallel aggregation of data. Specifically, at the onset a plurality of aggregation jobs are processed, in parallel (one job to a thread), to aggregate a data set from a lowest granular level to a desired higher level. In specific embodiments of the invention the aggregation jobs may conducted on the output of a modeling tool, wherein each aggregation job is associated with a different input variable set provided to the modeling algorithm(s).

Once the aggregation jobs have been processed, a query set comprising multiple queries are executed, in parallel, for each aggregation job to divide and/or group (i.e., slice and dice) the results and the resulting divided/grouped aggregation job results are stored within a single table of database. By performing both the aggregation jobs and the dividing/grouping of the results of the aggregated jobs in parallel, the present invention provides for a marked increase in the overall processing efficiency. Moreover, by storing the results of the aggregation and dividing/grouping processes in one table having one database schema, the invention provides robustness and stability to downstream applications and processes.

In specific embodiments of the invention, parallel processing of query sets for aggregation jobs and the subsequent storage of divided/grouped aggregation results within a single table is made possible by implementing a hybrid dynamic database schema. The schema is a hybrid of both horizontal and vertical database schemas, in that, while a vertical schema has only one dimension-dimension value pair per record, the hybrid schema of the present invention provides for multiple dimension-dimension value pairs per record. In this regard, the schema provides for additionally fields, so called DimSets, with each additional field comprising one and typically multiple dimension-dimension value pairs. In this regard, while a vertical database schema can only perform aggregation and subsequent diving and grouping (i.e., slicing and dicing) using one isolated dimension-dimension pair, the hybrid schema of the present invention is capable of performing multiple aggregations and corresponding dividing and/or grouping processes (i.e., slicing and dicing) simultaneously (i.e., in parallel) using the multiple dimension fields. The dynamic nature of the database schema is realized by the ability of the schema to support various different additional fields (i.e., additional DimSet fields) with different combinations of dimension-dimension value pairs (i.e., a different list of dimensions). Each additional field serves as criteria by which the aggregated data can be divided and/or grouped. Moreover, whenever new criteria for dividing and grouping is required, a new additional field (i.e., DimSet field) can be added to the table while the overall table schema remains intact.

Figure 1:
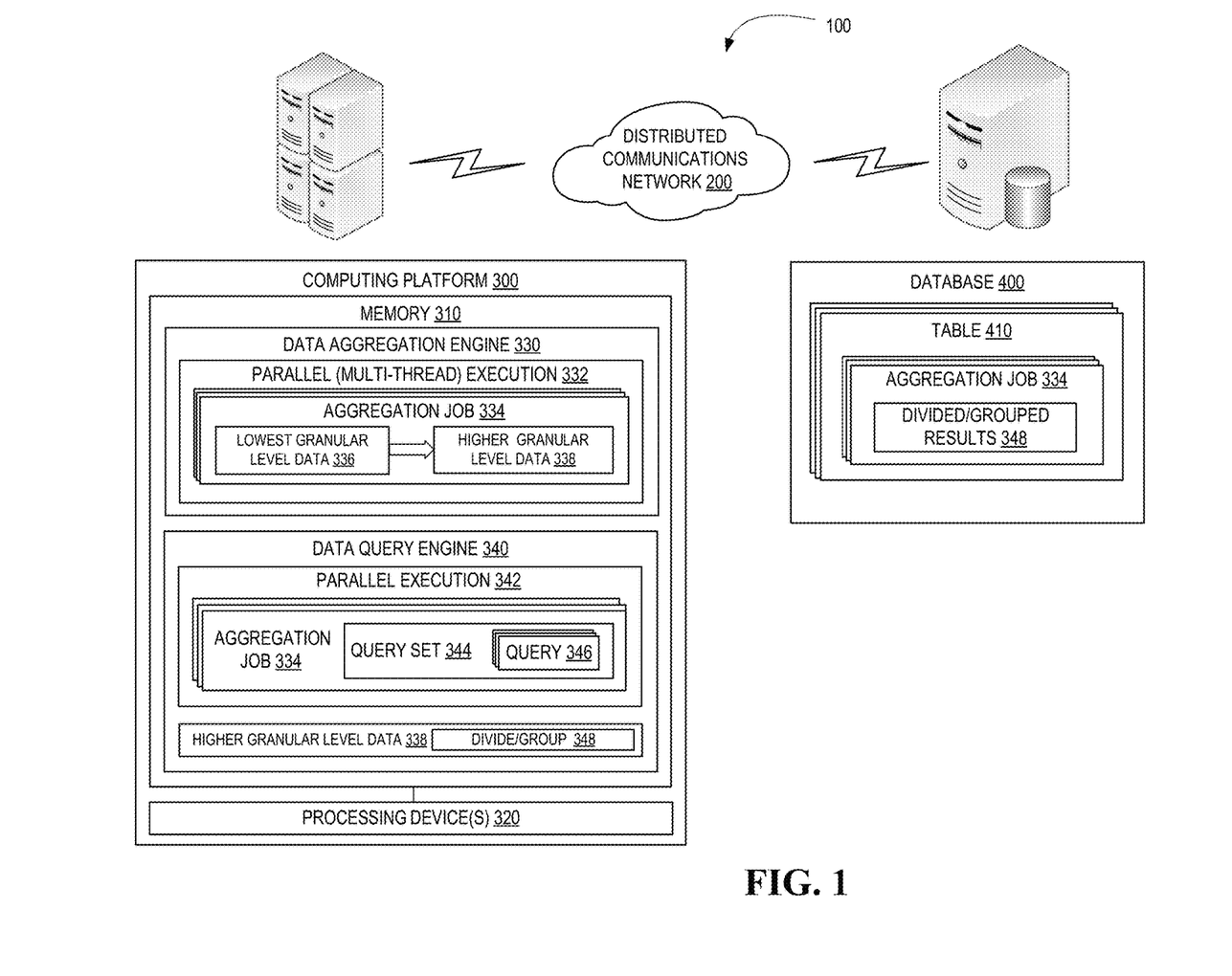
FIG. 1 is a schematic/block diagram of a system for multi-stage parallel dynamic data aggregation and dividing/grouping, in accordance with embodiments of the present invention.

Turning now to the figures, FIG. 1 illustrates a system 100 for multi-stage dynamic data aggregation and dividing and grouping (i.e., so-called "slicing and dicing"), in accordance with embodiments of the invention. The system 100 is implemented in a distributed communication network 200, which may include the Internet, one or more intranets, one or more cellular networks or the like. The system includes a computing platform 300, which may comprise one or more application servers or the like. Since the computing platform 300 is configured to process so-called "big data", i.e., extremely large and/or complex data sets that are conventionally too large to be processes by traditional application software, the computing platform 300 typically will comprise multiple computing devices. Such as multiple servers or the like. The computing platform 300 includes memory 310 and one or more processing devices 320 in communication with memory 310.

The memory 310 of computing platform 300 stores data aggregation engine 330 that is executable by processing device(s) 320 and configured to perform parallel execution 332 on multiple thread of a plurality of aggregation jobs 334. The aggregation jobs are configured to aggregate data, such as data outputted by modelling tools or the like, from a lowest granular level data 336 to a predetermined higher granular level data 338. In this regard, data aggregation engine is configured to execute the multiple threads (i.e., one thread per aggregation job) simultaneously (i.e., in parallel). Aggregation is generally performed to more efficiently execute large query sets on data.

The memory 310 of computing platform 300 additionally stores data query engine 340 that is executable by processing device(s) 320 and configured to receive a query set 344 comprising one or more queries 346 for each of the aggregation jobs 344. Each query 346 in the query set 344 defines one or more dimension fields in a database schema. Further, data query engine 340 is configured to perform parallel execution 342 of the queries 346 within the query sets 344 to divide and/or group (i.e., slice and dice) the results of a corresponding aggregation job 334. In this regard, the higher granular level data 338 is divided and/or grouped 348 in accordance with the one or more dimension fields associated with each query 344. In addition to executing the queries 346 within a given query set 344 in parallel, in specific embodiments of the system, the query sets 344 themselves are executed in parallel.

The system 100 additionally includes a database 400 that is in network communication with computing platform 300 via distributed communication network 200. The database 400 comprises multiple tables 410. In accordance with embodiments of the invention, a single one of tables 410 is configured to store the aggregated and divided/grouped results 348 of each of the plurality of aggregation job 334.

Figure 2:
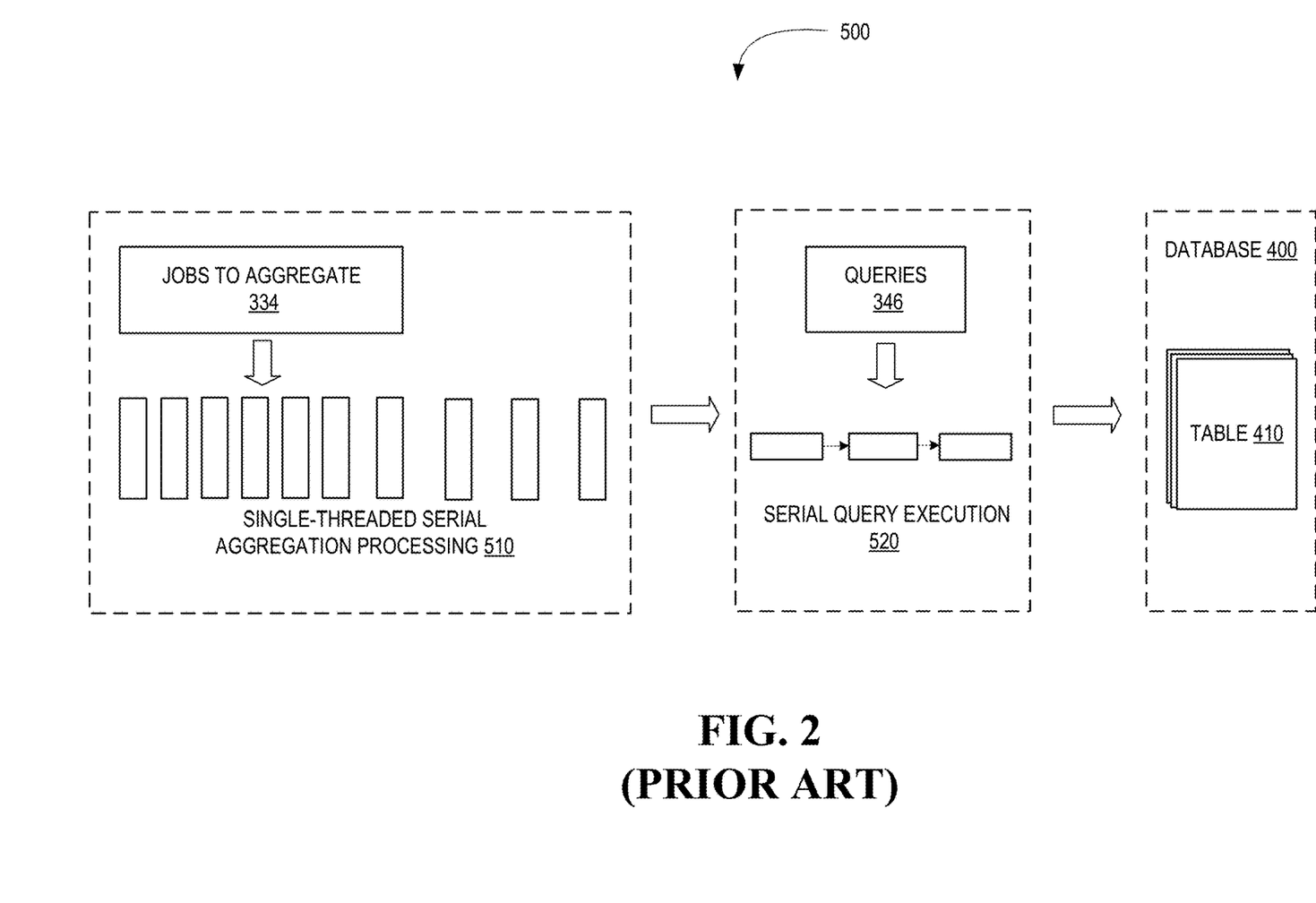
FIG. 2 is a block diagram of a system for serial data aggregation and dividing/grouping, in accordance with the prior art.
Figure 3:
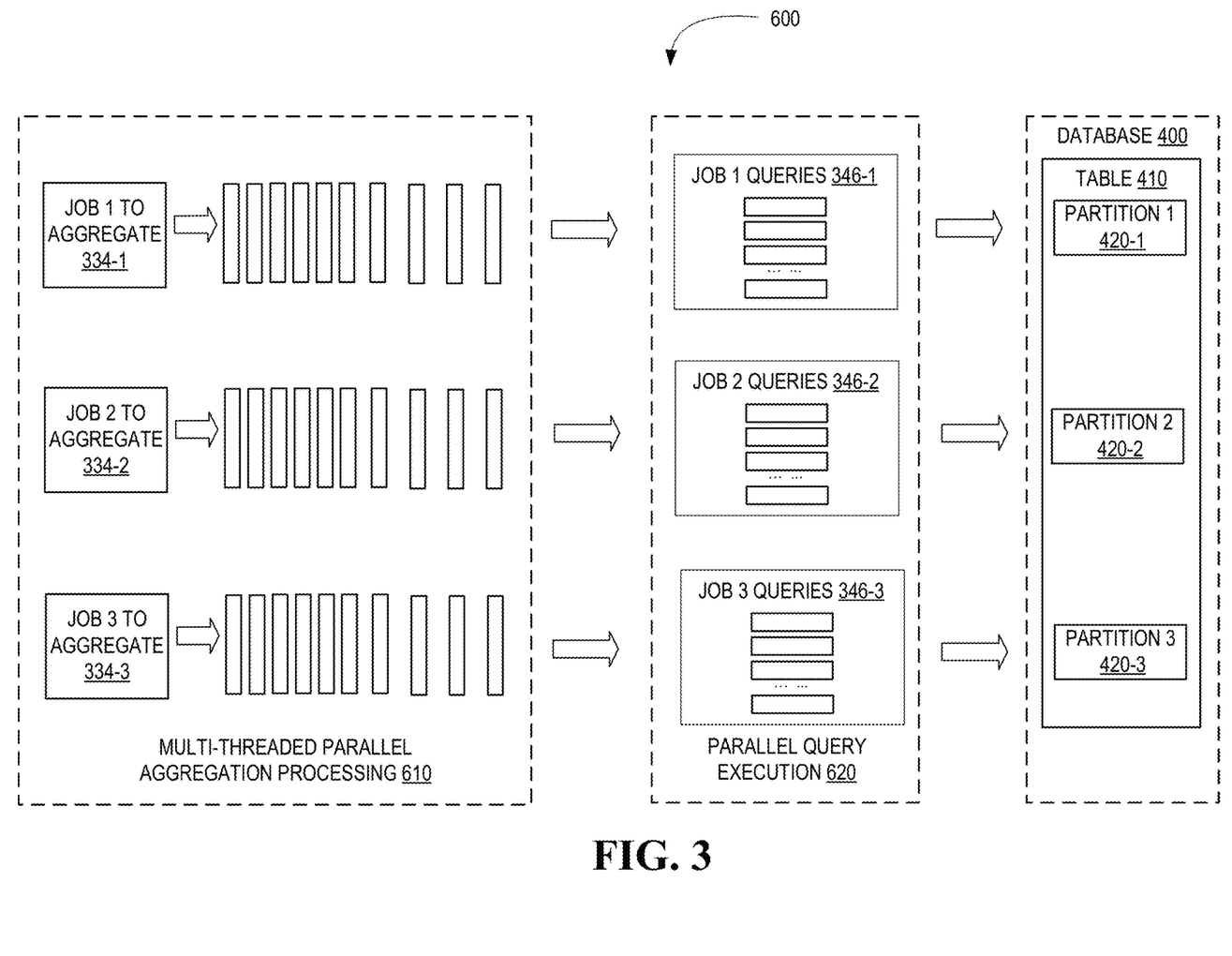
FIG. 3 is a block diagram of a system for multi-stage parallel data aggregation and dividing/grouping, in accordance with embodiments of the present invention.

Referring to FIGS. 2 and 3, these illustrations highlight the differences between conventional serial processing data aggregation and dividing and/or grouping (FIG. 2) and the multi-staged parallel processing data aggregation and dividing and/or grouping of the present invention (FIG. 3).

Specifically, FIG. 2 highlights a fully serial mode 500 of data aggregation and dividing and grouping, according to the prior art. Each of the plurality of aggregation jobs 334 are executed according to single-threaded serially processing 510. In other words, a first aggregation job is executed on the single thread and completed prior to the initiation of a second aggregation job on the single thread, and so on. In addition, each of the queries 346 associated with one of the corresponding aggregation jobs 334 undergo serial query execution 520 and subsequently the divided/grouped results of the aggregation jobs 334 are loaded into one or more tables 410 of database 400. However, since data aggregation and subsequent dividing and grouping (i.e., data segregation) may be performed on massive volumes of data, such serial processing is highly inefficient. For example, in certain instances it may take days to complete the execution of a data aggregation and dividing/grouping process that involves a large data set and a high number of aggregation jobs.

The present invention seeks to overcome these inefficiency concerns by implementing multi-stage parallel processing. As shown in FIG. 3, a multi-stage parallel mode 600 of data aggregation and dividing/grouping serves to expedite processing and results in significant performance boosts (as shown and described infra. In relation to FIG. 5). Each of the plurality of aggregation jobs 334-1, 334-2, and 334-3 are executed according to multi-threaded parallel aggregation processing 610. Specifically, each thread of the multi-thread processing executes one of the aggregation jobs 334-1, 334-2, 334-3 simultaneously to aggregate data from a lowest granular level to predetermined higher granular level. While FIG. 3 depicts three aggregation jobs 334 it should be understood that the plurality of the aggregation jobs 334 may include more than three jobs. Once an aggregation job 334 has been completed, the queries 346-1, 346-2, 346-3 associated with a corresponding aggregation job undergo parallel query execution 620, during which queries 346 within a query set 344 (shown in FIG. 1) are executed simultaneously. Once the query sets have been executed, the results are stored in single table 410 of database 400. In specific embodiments of the invention, the storing of the segregated results is made possible by partitioning the table 410, such that each partition 420-1, 420-2, 420-3 stores the results of a corresponding aggregation job 334-1, 334-2, 334-3. By limiting the storage of the results of the plurality of aggregation jobs 334 to a single table 410 within a database 400, downstream applications and systems that rely on the data are less likely to experience compatibility issues in the event that the database is changed (i.e., new fields added, fields removed or the like).

Figure 4:
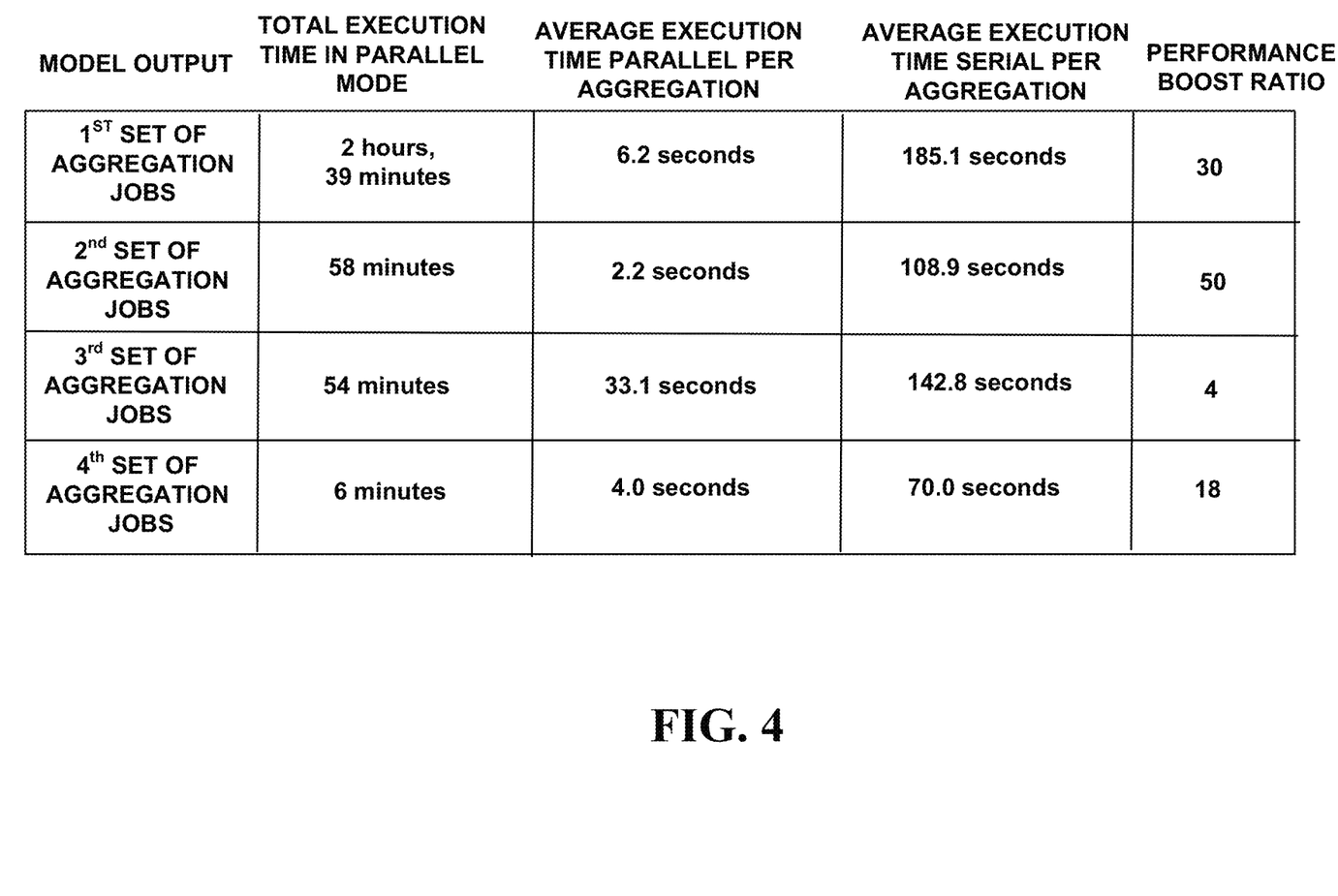
FIG. 4 is a chart illustrating the dramatic performance boosts exhibited by various processes implementing the multi-stage parallel data aggregation and dividing/grouping, according to the present invention.

Referring to FIG. 4, a chart is depicted that shows the performance boost realized in using multi-stage parallel data aggregation and dividing/grouping (i.e., segregating) over serial data aggregation and dividing/grouping, in accordance with embodiments of the present invention. The sets of aggregation jobs are results from various different modeling tools. The first set of aggregation jobs results in total execution time in parallel mode of 2 hours and 39 minutes with an average execution time per aggregation of 6.2 seconds. When the first set of aggregation jobs is executed in serial mode the average execution time per aggregation is 185.1 seconds. Thus, the resulting performance boost ratio is 30 from implementing parallel processing over serial processing. The second set of aggregation jobs results in total execution time in parallel mode of 58 minutes with an average execution time per aggregation of 2.2 seconds. When the second set of aggregation jobs is executed in serial mode the average execution time per aggregation is 108.9 seconds. Thus, the resulting performance boost ratio is 50 from implementing parallel processing over serial processing.

The third set of aggregation jobs results in total execution time in parallel mode of 54 minutes with an average execution time per aggregation of 33.1 seconds. When the second set of aggregation jobs is executed in serial mode the average execution time per aggregation is 142.8 seconds. Thus, the resulting performance boost ratio is 4 from implementing parallel processing over serial processing. The fourth set of aggregation jobs results in total execution time in parallel mode of 6 minutes with an average execution time per aggregation of 4.0 seconds. When the second set of aggregation jobs is executed in serial mode the average execution time per aggregation is 70.0 seconds. Thus, the resulting performance boost ratio is 18 from implementing parallel processing over serial processing.

Figure 5:
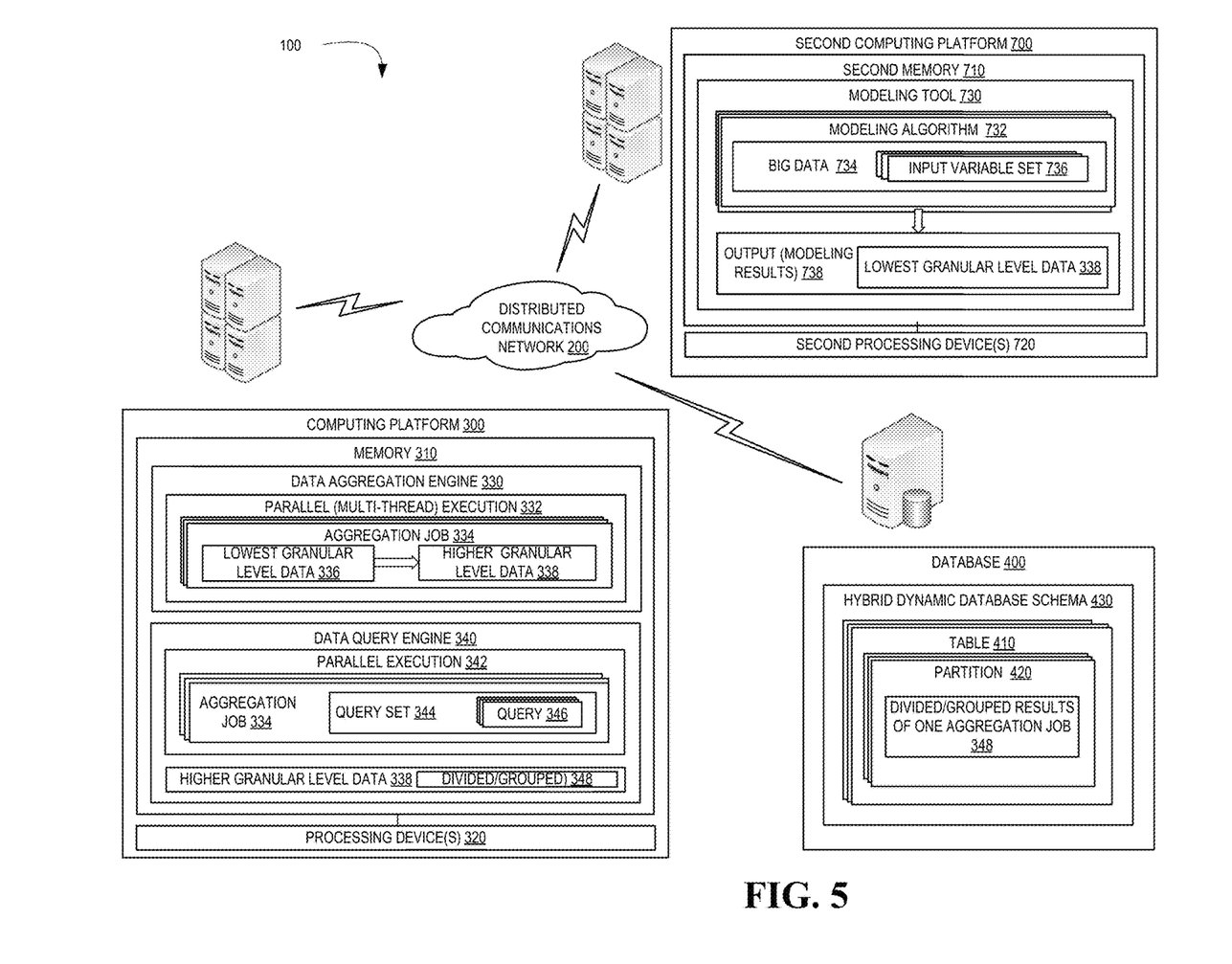
FIG. 5 is a schematic/block diagram of a system for multi-stage parallel dynamic data aggregation and dividing/grouping, in accordance with alternate embodiments of the present invention.

Referring to FIG. 5, a schematic and block diagram is depicted of a system 100 for multi-stage dynamic parallel data aggregation, in accordance with various alternate embodiments of the invention. As previously discussed, the system 100 is implemented in a distributed communications network 200, such as the Intranet, one or more intranets, and/or cellular networks. The system 100 includes computing platform 300, which may comprise one or more computing devices (e.g., application server(s) or the like) and is configured to execute software programs, including instructions, algorithms, modules, routines, applications, tools and the like. Computing platform 300 includes memory 310 and the like which may comprise volatile and non-volatile memory, such as read-only and/or random-access memory (RAM and ROM), EPROM, EEPROM, flash cards, or any memory common to computing platforms). Moreover, memory 310 and the like may comprise cloud storage, such as provided by a cloud storage service and/or a cloud connection service.

Further, computing platform 300 also includes at least one processing device 320, which may be an application-specific integrated circuit ("ASIC"), or other chipset, logic circuit, or other data processing device configured to execute data aggregation engine 330 and data query engine 340. Processing device(s) 320 or the like may execute one or more application programming interface (APIs) (not shown in FIG. 5) that interface with any resident programs, such as data aggregation engine 330 and data query engine 340 or the like stored in the memory 310 of the computing platform 300 and any external programs. Processing device(s) 320 may include various processing subsystems (not shown in FIG. 5) embodied in hardware, firmware, software, and combinations thereof, that enable the functionality of computing platform 300 and the operability of computing platform 300 on distributed communications network 200. For example, processing subsystems allow for initiating and maintaining communications and exchanging data with other networked devices, such as database 400 and second computing platform 700. For the disclosed aspects, processing subsystems of computing platform 300 may include any processing subsystem used in conjunction with data aggregation engine 330 and data query engine 340 and related engines, tools, routines, sub-routines, algorithms, sub-algorithms, sub-modules thereof.

Computing platform 300 may additionally include a communications module (not shown in FIG. 5) embodied in hardware, firmware, software, and combinations thereof, that enables electronic communications between computing platform 300 and other network devices, such as, but not limited to, database 400 and second computing platform 700. Thus, communication module may include the requisite hardware, firmware, software and/or combinations thereof for establishing and maintaining a network communication connection with one or more network devices.

Memory 310 stores data aggregation engine 330 and data query engine 340 which, as described in relation to FIG. 1, are configured to aggregate and segregate (i.e., divide and/or group) a data set via multi-stage parallel processing. Specifically, as previously discussed, data aggregation engine 330 is configured to perform parallel execution 332 on multiple thread of a plurality of aggregation jobs 334. The aggregation jobs are configured to aggregate data from a lowest granular level data 336 to a predetermined higher granular level data 338. In specific embodiments of the system, the lowest granular level data 336 is an output of a modeling tool or another big data processing tool.

Thus, in such embodiments system 100 additionally comprises second computing platform 700 that includes second memory 710 and one or more second processing devices 720 in communication with memory 710. Memory 710 stores modelling tool 730 that includes one or more modelling algorithms 732 which are configured to receive an input variable set 736 (which defines an aggregation job) and apply such to big data 734 to output modelling results 738 as the lowest granular level of data 338. Modelling tools 730 are utilized in various industries to predict future outcomes and/or events. For example, in the financial sector modelling tools may be implemented to predict credit loss, predict future capital reserve, predict when to execute security trades and the like.

As previously discussed, data query engine 340 is configured to receive a query set 344 comprising one or more queries 346 for each of the aggregation jobs 344 and perform parallel execution 342 of the queries 346 within the query sets 344 to divide and/or group (i.e., slice and dice) the results of a corresponding aggregation job 334. In this regard, the higher granular level data 338 is divided/grouped 348 in accordance with the one or more dimension fields associated with each query 344.

Moreover, system 100 includes database 400 that is configured to store the divided/grouped results 348 of the aggregation jobs 334 in a single table 410, which, according to specific embodiments of the invention, includes a plurality of partitions 420, with each partition being configured to store the divided/grouped results 348 of a corresponding one of the aggregation jobs 334.

In specific embodiments of the invention, parallel execution 342 of the queries 346 and storage in a single table of aggregation/segregated results is made possible by implementing a hybrid dynamic database schema 430, in accordance with embodiments of the present invention. A hybrid dynamic database schema 430, which in and of itself forms embodiments of the present invention, is a hybrid using characteristics of both a convention horizontal database schema and a conventional vertical database schema. Unlike a vertical database schema, in which each record is limited to a single dimension-dimension value pair (and thus, processing of queries must be performed sequentially, the hybrid dynamic database schema 430 of the present invention is configured to allow for multiple dimension-dimensional value pairs. In this regard, the hybrid dynamic database schema 430 provides for an additional field (referred to herein as DimSet), which includes a group or set of dimensions fields (i.e., a group of dimension-dimensional value pairs). Each dimension field in the DimSet field provides for a different manner by which a data set can be segregated (i.e., sliced and diced).

The dynamic nature of the hybrid dynamic database schema 430 provides for additional fields, i.e., additional DimSet fields to be dynamically added to the schema when different manners of diving/grouping data sets are required. Since one table is able to accommodate multiple different additional DimSet fields, the present invention avoids the use of multiple tables, as would be required with a vertical database schema in which the tables are limited to one dimension-dimension value pair. By limiting the storage of aggregation job results to a single table, downstream processing only needs to point to one as opposed to multiple tables. This provides more robustness and flexibility to the schema, in that, changes to a database (e.g., addition of new fields, removal of fields and the like) need only occur in a single table as opposed to multiple tables, lessening their impact on downstream applications and systems.

Figure 6:
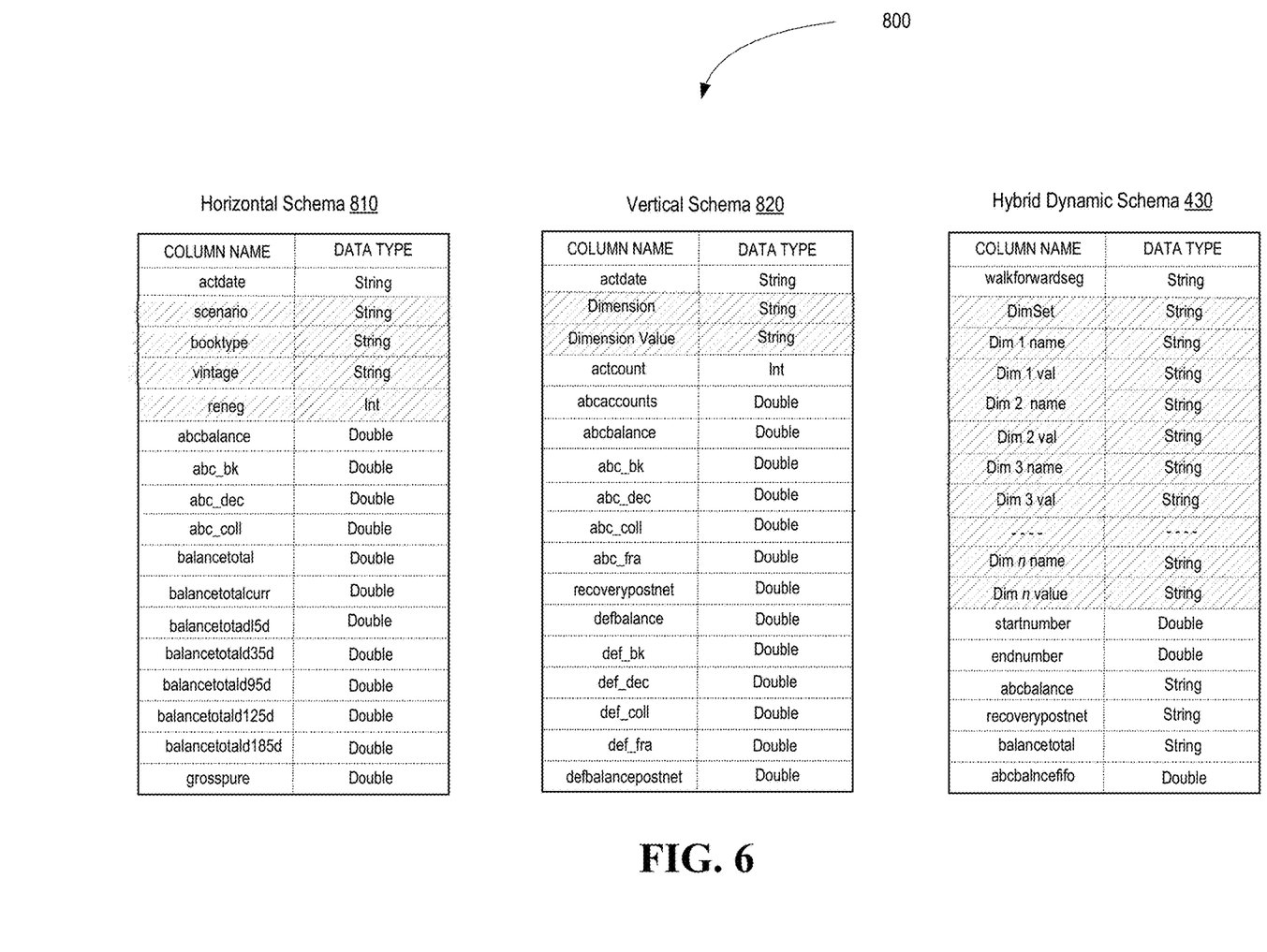
FIG. 6 is a schematic diagram illustrating differences between a horizontal database schema, a vertical database schema and hybrid dynamic database schema of the present invention.

Referring to FIG. 6 a comparison 800 is shown between a horizontal database schema 810, a vertical data base schema 820 and the hybrid dynamic database schema 830 of the present invention. A horizontal database schema 810 specifically lays out dimension fields expressly. The dimension fields are visible and comprehensible. However, a horizontal database schema 810 is rigid and, as such, when schema changes occur (i.e., adding a new field, deleting a field or the like), the downstream impact is severe (i.e., addition time/cost is involved with migrating data downstream in response to horizontal database schema changes).

A vertical database schema 820 is limited by one dimension-dimension value pair (i.e., one dimension field) per record. In this regard, in a vertical database schema 820 it is not feasible to stack up all the dimension fields in one table/record. As such, each dimension field warrants its own record. A vertical database schema 820 is viewed as a flexible schema, since making changes (e.g., adding a new dimension field, deleting a dimension field) does not change the structure, it merely provides for adding or removing records/tables to accommodate the change. However, for purposes of aggregation the vertical database schema 820 is limited to one dimension-dimension value pair, and, as such, granular aggregation, such as segregating (i.e., slice and dicing) is isolated to the one dimension-dimension value pair. This means that if dividing/grouping is required by four different dimension fields, four different tables/records are required for storing the data.

The hybrid dynamic database schema 830 of the present invention is robust and highly flexible. Unlike the vertical database schema, which only one has one dimension-dimension value pair and is not suitable for parallel processing of queries, the hybrid dynamic database schema 830 is configured to allow for multiple dimension-dimension value pairs. Specifically, the hybrid dynamic database schema 830 provides for an additional new field which includes a group of different dimension-dimension value pairs. The group of dimension-dimension value pairs can extend up to n number of dimension-dimension value pairs, wherein n is a maximum number of possible dimensions required in each of the one or more tables in the database.

As shown in FIG. 6, the new field is referred to as "DimSet". While FIG. 6 depicts a hybrid dynamic database schema with only one additional/DimSet field, the dynamic nature of the hybrid dynamic database schema 830, means that as new approaches to segregating data are needed, additional DimSet fields can be added to the schema, which include a new grouping of dimension fields. In this regard, instead of relying on multiple different table/records to store data (such as required by a vertical database schema), the hybrid dynamic database schema 830 of the present invention only requires one table with how ever many additional/DimSet fields are required to accommodate granular data segregating needs. In other words, the hybrid dynamic database schema of the present invention makes it possible to perform multiple diving/grouping processes in parallel and store the results in one database table.

Those of ordinary skill in the art should appreciate that while the hybrid dynamic database schema requires added data storage to accommodate the additional fields, use of known columnar storage formats, which support compression encoding techniques, serve to limit the data storage requirements.

Figure 7:
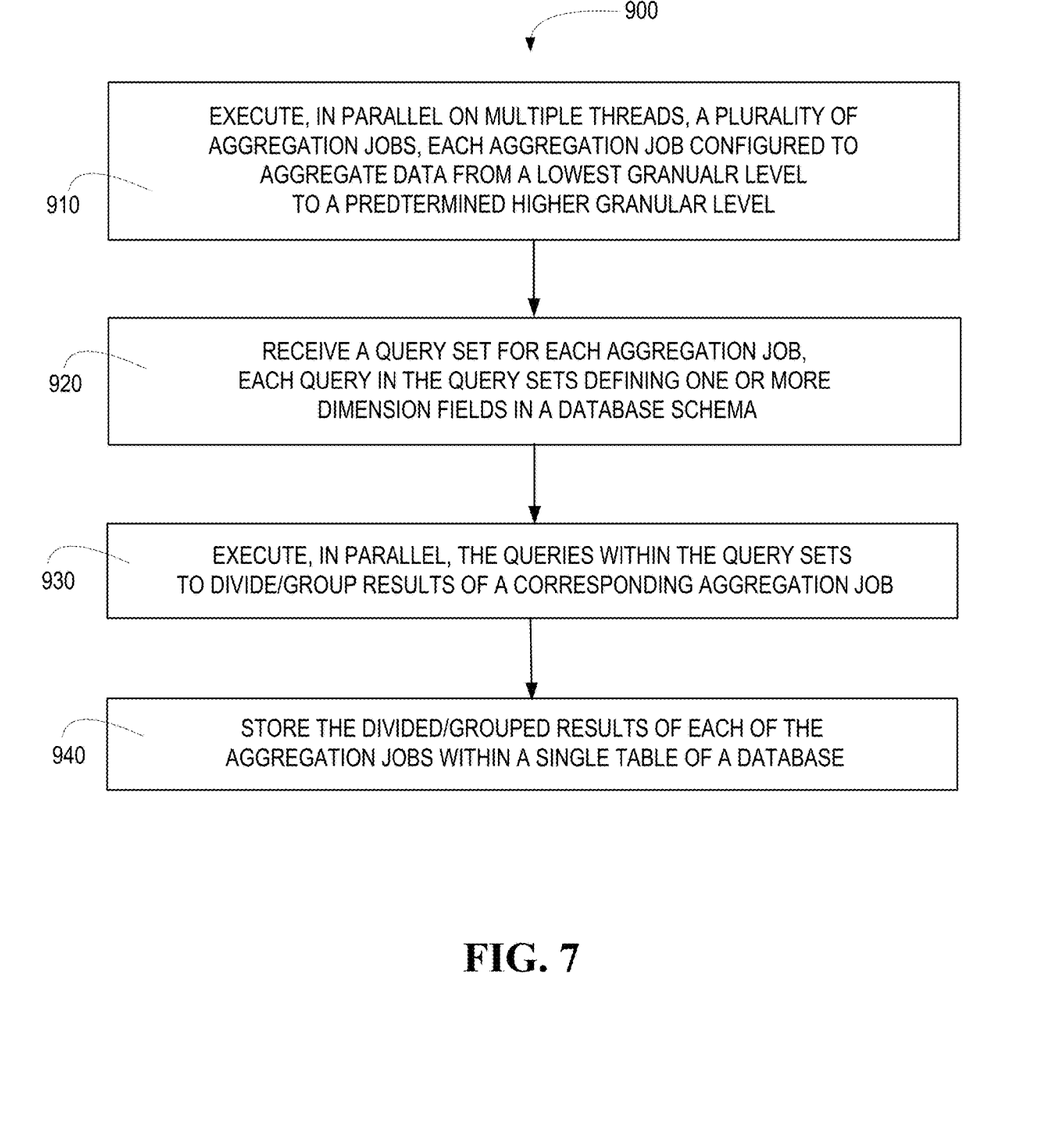
FIG. 7 is a flow diagram of a method for multi-stage dynamic data aggregation and dividing/grouping, in accordance with embodiments of the present invention.

Referring to FIG. 7 a flow diagram is presented of a methodology 900 for multi-stage parallel aggregation and segregation of big data, in accordance with embodiments of the present invention. At Event 910, a plurality of aggregation jobs are executed in parallel on multiple threads (i.e., one thread per aggregation job). Each aggregation job is configured to aggregate data from a lowest granular level to a predetermined higher granular level. In specific embodiments of the method, the aggregation jobs are performed on results from a modeling tool, such that each aggregation job is defined by different input variable sets applied to a corpus of big data being modeled.

At Event 920 a query set comprising one or more queries (typically a plurality of queries) is received for each aggregation job. Each query defining one or more dimension fields in a database schema. At Event 930, the queries within the query sets are executed in parallel to divide/group, otherwise referred to as segregate the results of a corresponding aggregation job.

At Event 930, the divided/grouped results of each aggregation job are stored with a single table/record of a database. In specific embodiments of the method, the single table/record is partitioned, such that, each partition stores the segregated results of a corresponding one of the aggregation jobs.

In specific embodiments of the method, parallel processing of the queries in the query sets and storage of the segregated results of the aggregation jobs within a single table is made possible by implementation of a highly robust, stable and flexible database schema, referred to herein as a hybrid dynamic database schema. The hybrid dynamic database schema blends together attributes of both a horizontal database schema and a vertical database schema. The hybrid dynamic database schema is configured to allow for multiple dimension-dimension value fields (i.e., multiple dimension fields). Specifically, the hybrid dynamic database schema is configured to allow for one or more additional fields, referred to herein as a "DimSet" field, each of which includes a grouping of dimension-dimension value pairs. The number of dimension-dimension value pairs in any one grouping can be up to the maximum number of possible dimensions required in each of the one or more tables in the database. The dynamic nature of this schema means that as new dividing/grouping requirements are required for an aggregation job, a new additional/DimSet field can be added that includes the grouping of dimension-dimension value pairs needed to perform the requisite segregation/slicing and dicing function. Furthermore, since the hybrid dynamic database structure allows for divided/grouped data from all of the aggregation jobs to be stored in one table, the downstream impact due to changes in the database (adding new fields, removing fields or the like) is minimized.

As evident from the preceding description, the systems, methods and the like described herein represents an improvement in technology, specifically, embodiments of the present invention provide for multi-stage parallel aggregation of data for purposes increasing the overall efficiency of the aggregation process. Multiple aggregation jobs are executed simultaneously on separate threads to aggregate data from a lowest granular level to a predetermined higher level. Subsequently, multiple queries are executed in parallel on the results of each aggregation job to divide/group (i.e., "slice and dice") the data according the criteria defined by the queries. The resulting divided/grouped and aggregated data is stored within a single table, portioned according to aggregation jobs. By storing the resulting data in one table, the present invention additionally adds flexibility and robustness to the overall aggregation process and downstream processing implications.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for multi-stage parallel aggregation of big data, the system comprising:
    a first computing platform including a first memory, and one or more first processing devices stored in the second memory; and
    a modeling tool stored in the first memory, executable by at least one of the first processing devices and configured to:
    receive a plurality of input variable sets,
    execute one or more modeling algorithms on the big data based on the input variable sets, and
    output, for each input variable set, results of the one or more modeling algorithms, wherein the results of the one or more modeling algorithms predict a future outcome;
    a second computing platform including a second memory, and one or more second processing devices stored in the second memory;

a data aggregation engine stored in the second memory, executable by at least one of the second processing devices and configured to:
  receive the results of the one or more modeling algorithms;
  execute, in parallel on multiple threads, a plurality of aggregation jobs on the results of the one or more modeling algorithms, each aggregation job configured to aggregate data from a granular level to a higher level;
a data query engine stored in the memory, executable by at least one of the processing devices and configured to:
  receive a plurality of query sets for each of the aggregation jobs, each query in the plurality of query sets defining one or more dimension fields in a hybrid database schema,
  execute, in parallel, the queries within the plurality of query sets to group results of a corresponding aggregation job, and
a database comprising one or more tables, wherein a single table in the database is configured to store the grouped results of each of the plurality of aggregation jobs, wherein the database is configured with the hybrid database schema defined by each table in the database including a plurality of dimension set fields, each of the one or more dimension set fields corresponding to one of the plurality of query sets and comprising a set of dimension-dimension value pairs.

2. The system of claim 1, wherein the single table is divided into a plurality of partitions, each partition in the table is configured to store the result of one of the plurality of aggregation jobs.

3. The system of claim 1, wherein each set of dimension-dimension value pairs defines grouping criteria.

4. The system of claim 1, wherein each of the one or more dimensional set fields comprises up to n number of dimension-dimension value pairs, wherein n is a maximum number of possible dimensions required in each of the one or more tables in the database.

5. The system of claim 1, wherein the data aggregation engine is further configured to:
  store data to be aggregated in cache memory,
  share the data from the cache memory amongst the multiple threads, wherein the at least a portion of the data is data that is common amongst the multiple threads.

6. A computer-implemented method for multi-stage parallel aggregation of big data, the method executed by one or more computing processor devices and comprising:
  receive a plurality of input variable sets;
  execute one or more modeling algorithms on the big data based on the input variable sets;
  output, for each input variable set, results of the one or more modeling algorithms, wherein the results of the one or more modeling algorithms predict a future outcome;
  executing, in parallel on multiple threads, a plurality of aggregation jobs on the results of the one or more modeling algorithms, each aggregation job configured to aggregate data from a granular level to a higher level;
  receiving a plurality of query sets for each of the aggregation jobs, each query in the plurality of query sets defining one or more dimension fields in a hybrid database schema;
  executing, in parallel, the queries within the plurality of query sets to group results of a corresponding aggregation job; and
  storing the grouped results of each of the aggregation jobs within a single table of a database configured with the hybrid database schema defined by each table in the database including a plurality of dimension set fields, each of the one or more dimension set fields corresponding to one of the plurality of query sets and comprising a set of dimension-dimension value pairs.

7. The computer-implemented method of claim 6, wherein storing further comprises storing the grouped results of each of the aggregation jobs within the single table divided into a plurality of partitions, wherein each partition stores the grouped results of one of the plurality of aggregation jobs.

8. The computer implemented method of claim 6, further comprising:
  storing data to be aggregated in cache memory; and
  sharing the data from the cache memory amongst the multiple threads, wherein the at least a portion of the data is data that is common amongst the multiple threads.

9. A computer program product including non-transitory computer-readable medium that comprises:
  a first of codes for causing a computer to (i) receive a plurality of input variable sets, (ii) execute one or more modeling algorithms on the big data based on the input variable sets, and (iii) output, for each input variable set, results of the one or more modeling algorithms, wherein the results of the one or more modeling algorithms predict a future outcome;
  a second set of codes for causing a computer to execute, in parallel on multiple threads, a plurality of aggregation jobs, each aggregation job configured to aggregate data from a granular level to a higher level;
  a third set of codes for causing a computer to receive a plurality of query sets for each of the aggregation jobs, each query in the plurality of query sets defining one or more dimension fields in a hybrid database schema;
  a fourth set of codes for causing a computer to execute, in parallel, the queries within the plurality of query sets to group results of a corresponding aggregation job; and
  a fifth set of codes for causing a computer to store the grouped results of each of the aggregation jobs within a single table of a database configured with the hybrid database schema defined by each table in the database including a plurality of dimension set fields, each of the one or more dimension set fields corresponding to one of the plurality of query sets and comprising a set of dimension-dimension value pairs.

10. The computer program product of claim 9, wherein the fifth set of codes is further configured to cause the computer to store the grouped results of each of the aggregation jobs within the single table divided into a plurality of partitions, wherein each partition stores the grouped results of one of the plurality of aggregation jobs.

11. The computer program product of claim 9, further comprising a sixth set of codes for causing a computer to store data to be aggregated in cache memory and share the data from the cache memory amongst the multiple threads, wherein the at least a portion of the data is data that is common amongst the multiple threads.

* * * * *